US006879992B2

(12) United States Patent
Zohar

(10) Patent No.: US 6,879,992 B2
(45) Date of Patent: Apr. 12, 2005

(54) SYSTEM AND METHOD TO EFFICIENTLY ROUND REAL NUMBERS

(75) Inventor: Ronen Zohar, Gan-Ner (IL)

(73) Assignee: Intel Corporation, Santa Clara, CA (US)

( * ) Notice: Subject to any disclaimer, the term of this patent is extended or adjusted under 35 U.S.C. 154(b) by 646 days.

(21) Appl. No.: 09/752,750

(22) Filed: Dec. 27, 2000

(65) Prior Publication Data

US 2002/0087609 A1 Jul. 4, 2002

(51) Int. Cl.[7] .............................................. G06F 7/38
(52) U.S. Cl. ...................................................... 708/550
(58) Field of Search ................................. 708/550, 200, 708/204, 206, 495

(56) References Cited

U.S. PATENT DOCUMENTS 5,511,016 A * 4/1996 Bechade ..................... 708/497
5,764,555 A * 6/1998 McPherson et al. ........ 708/497
6,199,089 B1 * 3/2001 Mansingh ................... 708/497
6,205,461 B1 * 3/2001 Mansingh ................... 708/497
6,292,815 B1 * 9/2001 Abdallah et al. ........... 708/204
6,510,446 B1 * 1/2003 Fukagawa ................... 708/497
6,535,898 B1 * 3/2003 Yuval ......................... 708/204

* cited by examiner

Primary Examiner—Todd Ingberg
Assistant Examiner—Chat Do
(74) Attorney, Agent, or Firm—Joni Stutman-Horn

(57) ABSTRACT

The present invention provides a system and method to efficiently round real numbers. The system includes a rounding apparatus to accept an input value that is a real number represented in floating-point format, and to perform a rounding operation on the input value to generate an output value that is an integer represented in floating-point format. The system also includes a memory to store a computer program that utilizes the rounding apparatus. The system further includes a central processing unit (CPU) to execute the computer program. The CPU is cooperatively connected to the rounding apparatus and the memory.

25 Claims, 8 Drawing Sheets

SYSTEM AND METHOD TO EFFICIENTLY ROUND REAL NUMBERS

BACKGROUND

1. Field

This invention relates to a system and method to efficiently round real numbers.

2. General Background

The rounding of real numbers to integers is frequently used in mathematical or computational applications. Four rounding techniques are typically adopted, including "truncation", "rounding to the nearest integer", "floor", and "ceiling". The main difference among these rounding techniques is the handling of the fractional portion of the real number. Each of these four rounding techniques requires manipulation of real numbers represented in floating-point format. Since manipulations of floating-point data are costly, it would be useful to provide methods or apparatuses to efficiently round real numbers.

DETAILED DESCRIPTION OF THE INVENTION

The present invention provides a system and method to efficiently round real numbers.

A floating-point format is generally a data structure specifying the fields that comprise a floating-point numeral, the layout of those fields, and the arithmetic interpretation of those fields.

Figure 1A:
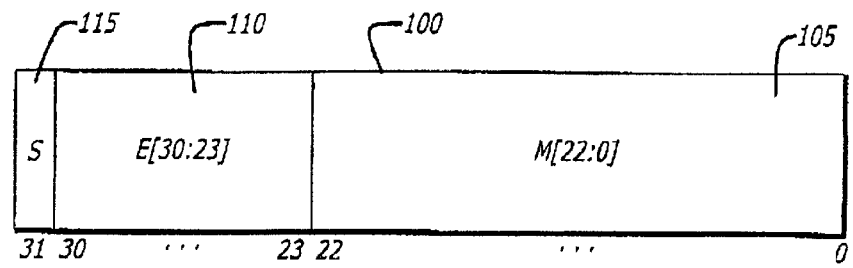
FIG. 1A shows a single precision floating-point data structure, as defined by the IEEE Standard for Binary Floating-Point Arithmetic, IEEE Std. 754-1985, published Aug. 12, 1985.

FIG. 1A shows a single precision floating-point data structure 100, as defined by the IEEE Standard for Binary Floating-Point Arithmetic, IEEE Std. 754-1985, published Aug. 12, 1985. The single precision floating-point data structure 100 consists of three fields: a mantissa (M) 105, an exponent (E) 110, and a sign (S) 115. These three fields are stored contiguously in one 32-bit word, with bit 0 being the least significant bit and bit 31 being the most significant bit.

Bits 0 to 22 contain the 23-bit mantissa 105. Mantissa 105 generally contains the fractional portion of a real number, and is sometimes called the fraction. It should be noted that real numbers are usually normalized so that the most significant digit of the mantissa 105 is non-zero, allowing the mantissa 105 to contain the maximum possible number of significant digits.

Bits 23 to 30 contain the 8-bit exponent 110. Exponent 110 is generally a binary integer representing the base-2 power to which the mantissa or fraction is raised. Exponents are typically represented in a biased form, in which a constant is added to the actual exponent so that the biased exponent is always a positive number. The value of the biasing constant depends on the number of bits available for representing exponents in the floating-point format being used. For example, the bias constant is 127 for the single precision floating-point format as defined by IEEE Standard 754.

It should also be noted that a mantissa, as defined by IEEE Standard 754, assumes a leading one (1). For example, a real number of $(1.\text{YYYYYY} \times 2^M)$—where 1.YYYYYY is a real number represented in base two (2), Y represents a digit in the fractional portion of the real number 1.YYYYYY, and M is a positive integer—is represented by a floating-point value in which YYYYYY is stored in the mantissa of the floating-point value, and M is stored in the exponent of the floating-point value.

Bit 31 is the sign bit 115. Sign bit 115 indicates whether the represented real number is positive or negative.

It should be noted that there are other floating-point formats, e.g., double precision, double extended precision, or the like. Descriptions of embodiments in accordance with the present invention will discuss only IEEE single precision floating-point format for illustrative purposes in order to avoid obscuring the present invention. However, the embodiments described below can be modified in accordance with inventive principles of the present invention to support floating-point formats other than the IEEE Standard 754 single precision floating-point format.

Figure 1B:
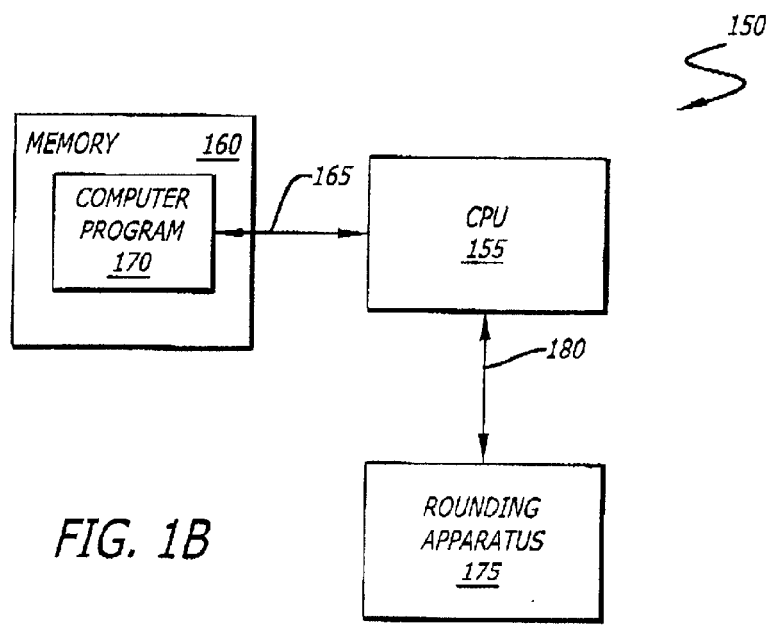
FIG. 1B is an exemplary block diagram of a computing system in accordance with one embodiment of the present invention.

FIG. 1B is a block diagram of a computing system 150 in accordance with one embodiment of the present invention. Computing system 150 includes a central processing unit (CPU) 155 and memory 160 that is cooperatively connected to the CPU 155 through data bus 165. CPU 155 is used to execute a computer program 170, which is stored in memory 160 and utilizes rounding apparatus 175.

CPU 155 is cooperatively connected to rounding apparatus 175 through data bus 180. Rounding apparatus 175 generally accepts as input a real number (X) which is represented in floating-point format, performs a rounding operation on the real number to generate an integer, and returns the integer. The integer is represented in floating-point format There are generally four techniques for rounding real numbers, including "truncation" or "rounding toward zero (0)", "rounding to the nearest integer" or "rounding toward the nearest representable value", "floor" or "rounding toward minus infinity (−∞)", and "ceiling" or "rounding toward plus infinity (+∞). The general difference among these rounding techniques is the handling of the fractional portion of the real number.

The "truncation" or "rounding toward zero (0)" technique retains the integral portion drops the fractional portion of the real number. For example, truncation of positive 1.90 (+1.90) would result in positive 1.0 (+1.0). As another example, truncation of negative 1.90 (−1.90) would result in negative 1.0 (−1.0).

Using the "rounding toward the nearest representable value", a real number would be rounded to its nearest integer value. For example, 1.60 would be rounded up to 2.0, and 1.40 would be rounded down to 1.0.

In the "floor" or "rounding toward minus infinity (−∞)" technique, a real number would generally be rounded down to the next integer value. For example, positive 1.90 (+1.90) would be rounded down to positive 1.0 (+1.0), and negative 1.90 (−1.90) would be rounded down to negative 2.0 (−2.0).

In the "ceiling" or "rounding toward plus infinity (+∞)" technique, a real number would generally be rounded up to the next integer value. As an example, positive 1.10 (+1.10) would be rounded up to positive 2.0 (+2.0). As another example, negative 1.10 (−1.10) would be rounded up to negative 1.0 (−1.10).

Figure 2:
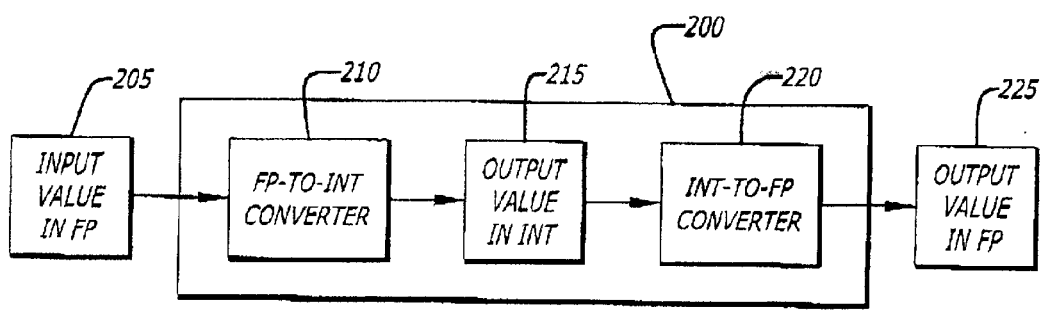
FIG. 2 is an exemplary block diagram of an apparatus for rounding real numbers using the truncation technique in accordance with the principles of the present invention.

FIGS. 2 to 5 are exemplary block diagrams of apparatuses for rounding a real number using the aforementioned rounding techniques. Each of the apparatuses shown in FIGS. 2 to 5 accepts an input value that is a real number represented in floating-point format, performs a rounding operation on the input value to generate an output value using one of the rounding techniques described above, and returns the output value that is an integer represented in floating-point format FIG. 2 is an exemplary block diagram of an apparatus 200 for rounding real numbers using the truncation technique in accordance with the principles of the present invention. Rounding apparatus 200 receives a real number 205 represented in floating-point format as input, performs a truncation operation on the real number 205, and outputs the truncated value 225 represented in floating-point format.

Rounding apparatus 200 includes a floating-point to integer (FP-to-INT) converter 210 and an integer to floating-point (INT-to-FP) converter 220. FP-to-INT converter 210 accepts as input a real number value 205, which is represented in floating-point format. FP-to-INT converter 210 converts the input value 205 to an integer 215 represented in a standard integer format, and returns the integer 215. In converting the input value 205 to the integer 215 represented in integer format, FP-to-INT converter 210 truncates the fractional portion of the input value 205. In one embodiment, FP-to-INT converter 210 may be implemented using the "cvttss2si" assembly instruction, which is included in the instruction sets of processors based on the Intel architecture. Additional details on the "cvttss2si" instruction can be found in the "Intel Architecture Software Developer's Manual: Volume 2 Instruction Set Reference" for the Intel Pentium® III processor.

INT-to-FP converter 220 accepts as input an integer 215, which is represented in a standard integer format. INT-to-FP converter 220 converts the integer 215 to a real number 225 represented in floating-point format, and outputs the real number 225. In one embodiment, FP-to-INT converter 210 may be implemented using the "cvtsi2ss" assembly instruction, which is included in the instruction sets of processors based on the Intel architecture. Additional details on the "cvtsi2ss" instruction can be found in the "Intel Architecture Software Developer's Manual: Volume 2 Instruction Set Reference" for the Intel Pentium® III processor.

The real number 225, which is the output of INT-to-FP converter 220, is essentially the result of a "rounding by truncation" operation performed on the input value 205.

Figure 3:
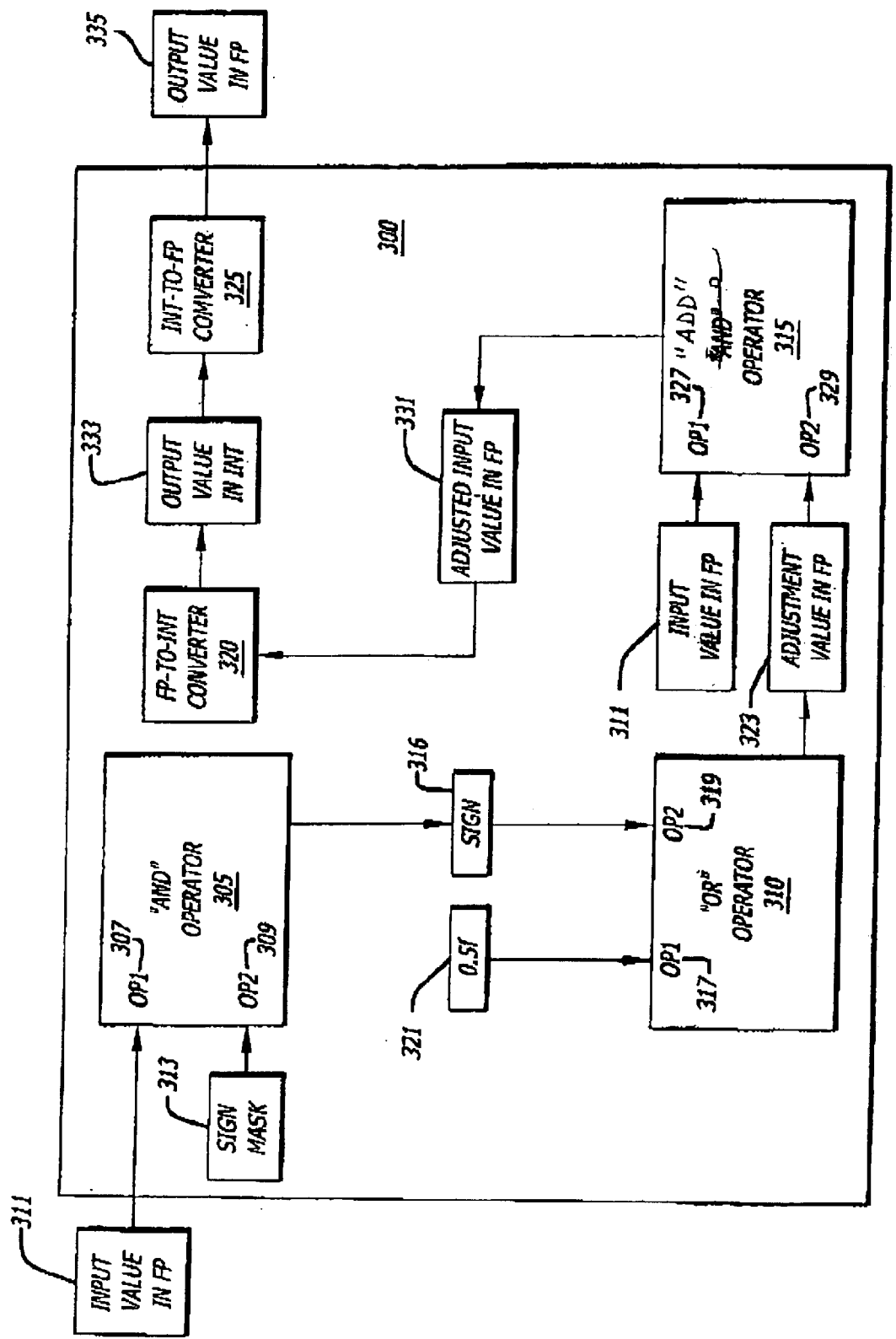
FIG. 3 is an exemplary block diagram of an apparatus for rounding real numbers using the "rounding to the nearest integer" or "rounding toward the nearest representable value" technique in accordance with one embodiment of the present invention.

FIG. 3 is an exemplary block diagram of an apparatus 300 for rounding real numbers using the "rounding to the nearest integer" or "rounding toward the nearest representable value" technique in accordance with one embodiment of the present invention. Rounding apparatus 300 includes an "AND" operator 305, an "OR" operator 310, an ADD operator 315, a floating-point to integer (FP-to-INT) converter 320, and an integer to floating-point (INT-to-FP) converter 325.

"AND" operator 305 has two operands 307, 309 and returns a bit-wise logical AND of the two operands 307, 309. Input value 311 is represented in floating-point format, and is fed into "AND" operator 305 as the first operand (OP1) 307 of the operator 305. Sign mask 313 is fed into "AND" operator 305 as the second operand (OP2) 309 of the operator 305. Sign mask 313 is generally a binary number that can be used in extracting the sign bit of a real number through a bit-wise logical AND operation. In one embodiment that supports a 32-bit single precision floating-point format as defined by IEEE Standard 754, sign mask 313 has a hexadecimal value of 0x80000000.

When input value 311 represented in floating-point format and sign mask 313 are fed into "AND" operator 305 as OP1 307 and OP2 309 respectively, "AND" operator 305 returns the sign bit 316 of input value 311.

"OR" operator 310 has two operands 317, 319, and returns a bit-wise logical OR of the two operands 317,319. A real value 321 of 0.5 represented in floating-point format is fed into "OR" operator 310 as the first operand (OP1) 317 of the operator 310. As stated above, "AND" operator 305 outputs the sign bit 316 of input value 311. Sign bit 316 is fed into "OR" operator 310 as the second operand (OP2) 319 of the operator 310. In one embodiment that supports a 32-bit single precision floating-point format as defined by IEEE Standard 754, the real value 321 of 0.5 is represented by a hexadecimal value of 0x3F000000.

When sign bit 316 and real value 321 are fed into "OR" operator 310 respectively as OP1 317 and OP2 319 of the operator 310, "OR" operator 310 returns a real value 323 of either negative 0.5 (−0.5) or positive 0.5 (+0.5), depending on whether sign bit 316 is negative (−) or positive (+). The output 323 of "OR" operator can generally be viewed as an adjustment value that is later added to input value 311 to properly round the input value 311. The adjustment value 323 is represented in floating-point format.

ADD operator 315 has two operands 327, 329, and returns the sum of the two operands 327, 329. Input value 311 is represented in floating-point format, and is fed into ADD operator 315 as the first operand (OP1) 327 of the operator 315. It should be noted that the value that is fed into OP1 327 of ADD operator 315 is the same value that is fed into OP1 307 of "AND" operator 305.

As stated above, "OR" operator 310 outputs an adjustment value 323 of either negative 0.5 (−0.5) or positive 0.5 (+0.5). The output 323 of "OR" operator 310 is fed into ADD operator 315 as the second operand (OP2) 329 of the ADD operator 315. The resulting output 331 of ADD operator 315 is an adjusted input value, which effectively is the sum of the input value 311 and the adjustment value 323.

FP-to-INT converter 320 generally converts a real number to an integer represented in a standard integer format. FP-to-INT converter 320 performs the conversion by truncating fractional portion of the real number. The output 331 of ADD operator 315 is fed into FP-to-INT converter 320. FP-to-INT converter 320 returns the output value 333 represented in a standard integer format.

INT-to-FP converter 325 generally converts an integer represented in a standard integer format to an integer represented in a floating-point format. The output 333 of FP-to-INT converter 320 is fed into INT-to-FP converter 325. INT-to-FP converter 325 returns an output value 335 represented in floating-point format. Output value 335 is the result of a "rounding to the nearest integer" operation performed on the input value 311.

Figure 4:
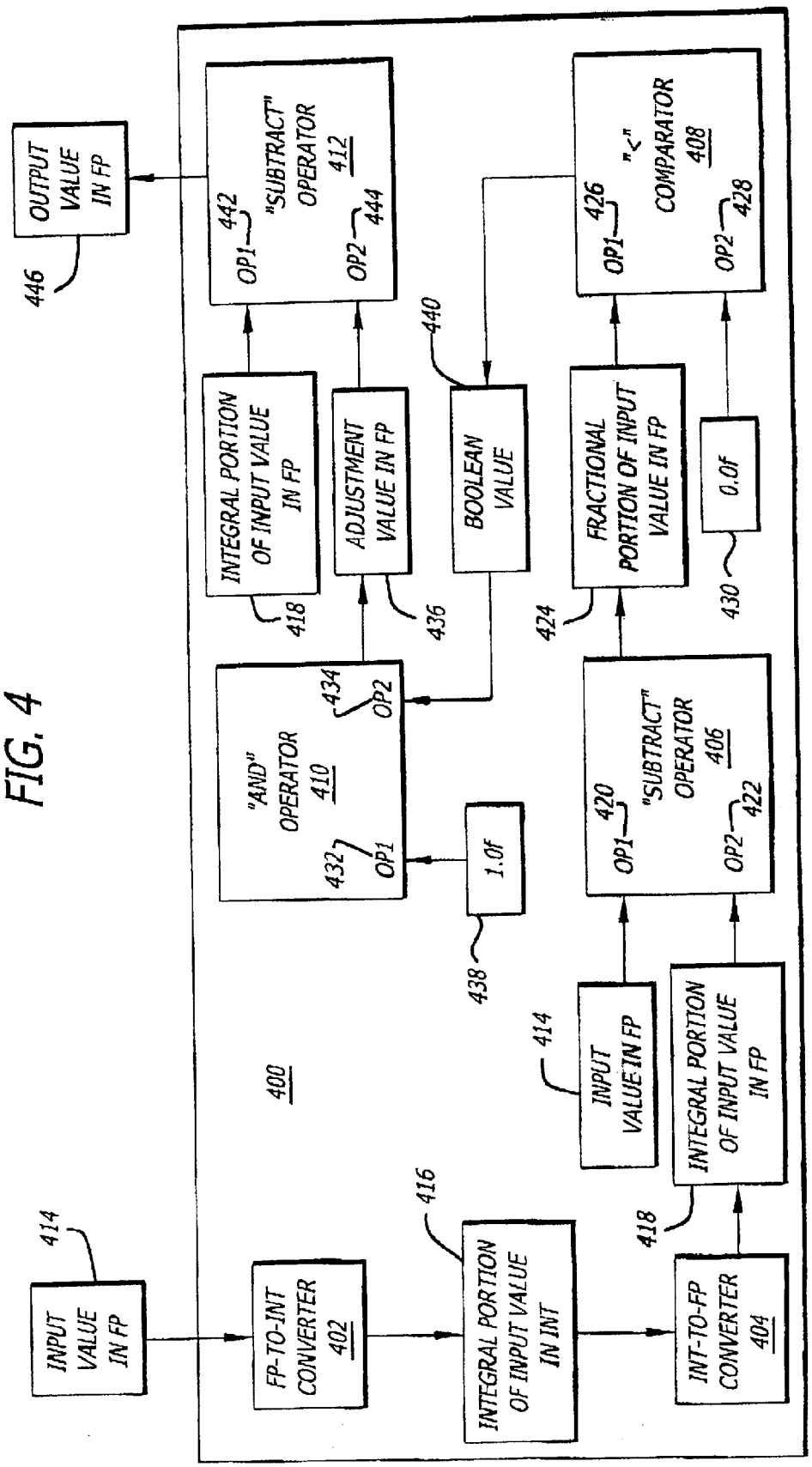
FIG. 4 is an exemplary block diagram of an apparatus for rounding real numbers using the "floor" or "rounding toward minus infinity (−∞)" technique in accordance with one embodiment of the present invention.

FIG. 4 is an exemplary block diagram of an apparatus 400 for rounding real numbers using the "floor" or "rounding toward minus infinity (−∞)" technique in accordance with one embodiment of the present invention. Rounding apparatus 400 includes a floating-point to integer (FP-to-INT) converter 402, an integer to floating-point (INT-to-FP) converter 404, SUBTRACT operator 406, "less than" or "<" comparator 408, "AND" operator 410, and SUBTRACT operator 412.

FP-to-INT converter 402 generally converts a real number to an integer represented in a standard integer format. FP-to-INT converter 402 performs the conversion by truncating the fractional portion of the real number. Rounding apparatus 400 uses FP-to-INT converter 402 to compute the integral portion 416 of input value 414. Input value 414 is a real number represented in floating-point format, and is fed into FP-to-INT converter 402. FP-to-INT converter 402 returns the integral portion 416 of input value 414. The integral portion 416 is represented in a standard integer format.

INT-to-FP converter 404 generally converts an integer represented in a standard integer format to an integer represented in floating-point format. The output 416 of FP-to-INT converter 402 is fed into INT-to-FP converter 404. INT-to-FP converter 404 returns the integral portion 418 of input value 414. The integral portion 418 is represented in floating-point format.

SUBTRACT operator 406 receives two operands 420, 422 and subtracts the second operand (OP2) 422 from the first operand (OP1) 420. Rounding apparatus 400 uses SUBTRACT operator 406 to compute the fractional portion of input value 414. Input value 414 is represented in floating-point format and is fed into SUBTRACT operator 406 as the first operand (OP1) 420 of the operator 406. It should be noted that the value that is fed into OP1 420 of SUBTRACT operator 406 is the same value that is fed into FP-to-INT converter 402.

The output 418 of INT-to-FP converter 404 is fed into SUBTRACT operator 406 as the second operand (OP2) 422 of the operator 406. As stated above, the output 418 of INT-to-FP converter 404 is essentially the integral portion of input value 414, and is represented in floating-point format SUBTRACT operator 406 computes the fractional portion 424 of input value 414 by subtracting OP2 422 from OP1 420. This fractional portion 424 is represented in floating-point format "<" or "less than" comparator 408 has two operands 426, 428, performs a comparison of these two operands 426,428, and returns a boolean value 440 of TRUE or FALSE. If the first operand (OP1) 426 is less than the second operand (OP2) 428, "<" comparator 408 returns a boolean value 440 of TRUE. Otherwise, "<" comparator 408 returns a boolean value 440 of FALSE.

In one embodiment, TRUE is represented by a 32-bit mask, in which each bit of the mask has a value of "1". In this embodiment, FALSE is represented by a 32-bit mask, in which each bit of the mask has a value of "0". However, it should be noted that a 32-bit mask is used to support single precision floating point format as defined by IEEE Standard 754. Accordingly, a mask that is longer or shorter than thirty-two (32) bits would be used to support a floating-point format that is different than the single precision format. As an example, a 64-bit mask would be used to support a double precision floating-point format as defined by IEEE Standard 754. As another example, an 80-bit mask would be used to support an extended double precision floating-point format as defined by IEEE Standard 754.

The output 424 of SUBTRACT operator 420 is fed into "<" comparator 408 as the first operand (OP1) 426 of the comparator 408. A real value 430 of 0.0 is fed into "<" comparator 408 as the second operand (OP2) 428 of the comparator 408. As stated above, the output of SUBSTRACT operator 408 is essentially the fractional portion 424 of input value 414, and is represented in floating-point format. Accordingly if the fractional portion 424 of input value 414 is less than 0.0, "<" comparator 408 returns a TRUE. Otherwise, "<" comparator 408 returns a FALSE.

"AND" operator has two operands 432,434, and performs a bit-wise logical AND on the two operands 432, 434, and returns the result. Rounding apparatus 400 uses "AND" operator 410 to generate an adjustment value of 0.0 or 1.0. The adjustment value 436 is represented in floating-point format, and is subtracted from the integral portion of input value to appropriately round the input value 414 in accordance with the "floor" or "rounding to minus infinity (−∞)" technique.

A real value 438 of 1.0 is fed into "AND" operator 410 as the first operand (OP1) 432 of the operator 434. The output 440 of "<" comparator 408 is fed into "AND" operator 410 as the second operand (OP2) 434 of the operator 410. As stated above, the output 440 of "<" comparator 308 is a boolean value 440. This boolean value 440 generally serves as a mask enabling "AND" operator to generate an appropriate adjustment value 436. "AND" operator 410 performs a bit-wise logical AND on OP1 432 and OP2 434, and returns an adjustment value 436. The adjustment value 436 is represented in floating-point format and has a real value of either 1.0 or 0.0.

SUBTRACT operator 412 receives two operands 442, 444, and subtracts the second operand (OP2) 444 from the first operand (OP1) 442. The integral portion 418 of input value is fed into SUBTRACT operator 412 as the first operand (OP1) 442 of the operator 412. It should be noted that the integral portion 418 is represented in floating-point format. It should also be noted that the value that is fed into OP1 442 of SUBTRACT operator 412 is the same as the value that is fed into OP2 422 of SUBTRACT operator 406.

The output 436 of "AND" operator 410 is fed into SUBTRACT operator 412 as the second operand (OP2) 444 of SUBTRACT operator 412. As stated above, the output 436 of "AND" operator 410 is an adjustment value of either 1.0 or 0.0. Accordingly, SUBTRACT operator 412 subtracts the adjustment value 436 from the integral portion 410 of input value, and returns the output value 446. The output value 446 is the result of a "rounding to minus infinity (−∞)" operation performed on the input value 414, and is represented in floating-point format.

Figure 5:
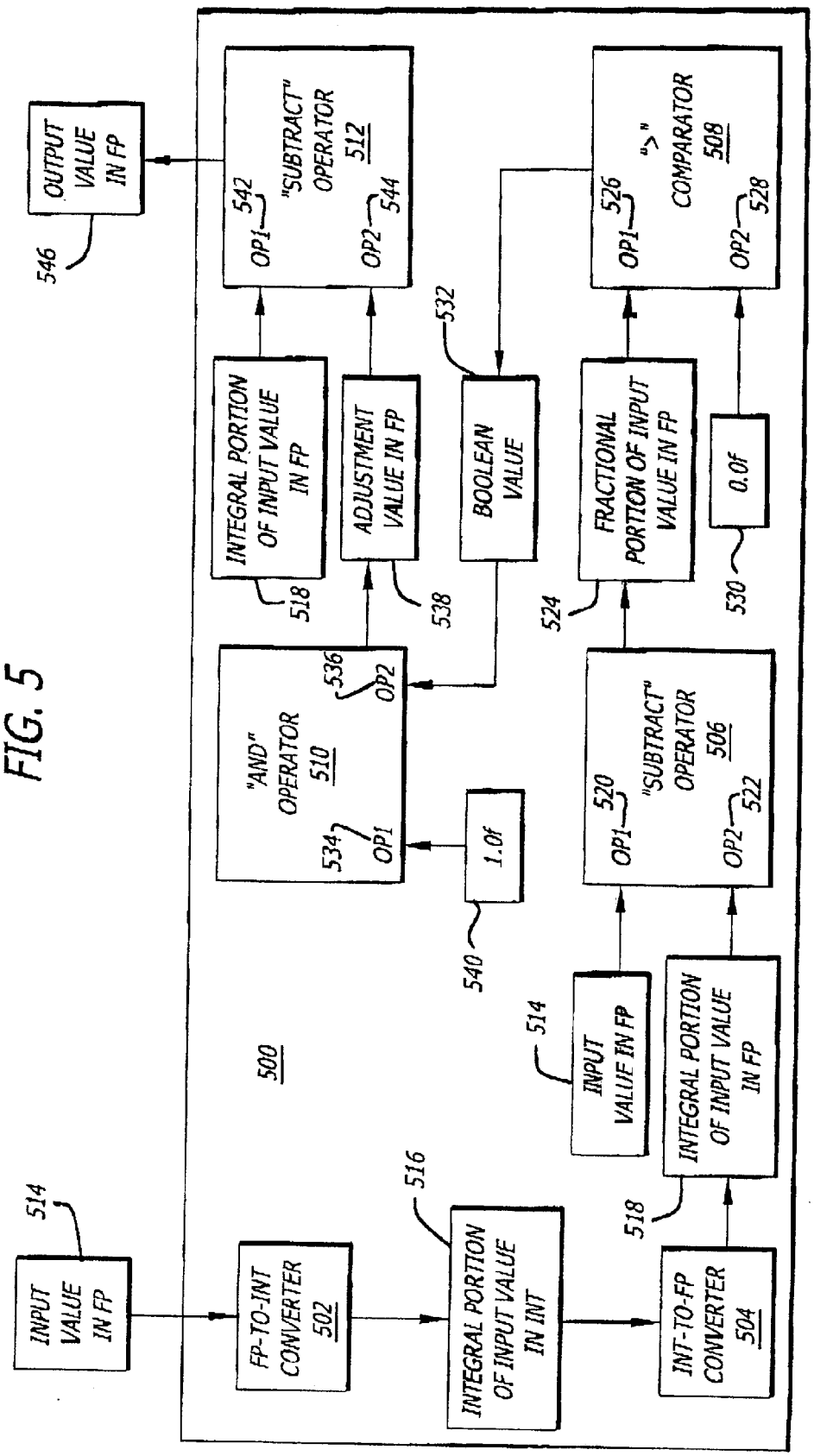
FIG. 5 is an exemplary block diagram of an apparatus for rounding real numbers using the "ceiling" or "rounding toward plus infinity (+∞)" technique in accordance with one embodiment of the present invention.

FIG. 5 is an exemplary block diagram of an apparatus 500 for rounding real numbers using the "ceiling" or "rounding toward plus infinity (+∞)" technique in accordance with one embodiment of the present invention. Rounding apparatus 500 includes a floating-point to integer (FP-to-INT) converter 502, an integer to floating-point (INT-to-FP) converter 504, SUBTRACT operator 506, "greater than" or ">" operator 508, "AND" operator 510, and ADD operator 512.

FP-to-INT converter 502 generally converts a real number into a signed integer represented in a standard integer format. FP-to-INT converter 502 performs the conversion by truncating the fractional portion of the real number. Rounding apparatus 500 uses FP-to-INT converter 502 to compute the integral portion of input value 514. Input value 514 is a real number represented in floating-point format, and is fed into FP-to-INT converter 502. FP-to-INT converter 502 returns the integral portion 516 of input value 514. This integral portion 516 is represented in a standard integer format.

INT-to-FP converter 504 generally converts an integer represented in a standard integer format to an integer represented in a floating-point format. The output 516 of FP-to-INT converter 502 is fed into INT-to-FP converter 504. As stated above, the output 516 of UP-to-INT converter 502 is effectively the integral portion of input value 514, and is represented in a standard integer format. INT-to-FP converter 504 converts the integral portion 516 represented in a standard format to a real number 518 represented in a floating-point format.

SUBTRACT operator 506 has two operands 520, 522, and subtracts the second operand (OP2) 522 from the first operand (OP1) 520. Rounding apparatus 500 uses SUBTRACT operator 506 to compute the fractional portion of input value 514. Input value 514 is represented in floating-point format, and is fed into SUBTRACT operator 506 as the first operand (OP1) 520 of the operator 506. The output of INT-to-FP converter is fed into SUBTRACT operator as the second operand (OP2) of the operator. As stated above, the output 518 of INT-to-FP converter 504 is the integral portion of input value, and is represented in floating-point format. SUBTRACT operator 506 computes the fractional portion of input value by subtracting OP2 522 from OP1 520. The output 524 of SUBTRACT operator 506 is effectively the fractional portion of input value 514, and is represented in floating-point format.

">" or "greater-than" comparator 508 has two operands 526, 528, performs a comparison of the two operands 526, 528, and returns a boolean value 532 of TRUE or FALSE. If the first operand (OP1) 526 is greater than the second operand (OP2) 528, ">" comparator 508 returns a boolean value 532 of TRUE. Otherwise, ">" comparator 508 returns a boolean value 532 of FALSE.

In one embodiment, TRUE is represented by a 32-bit mask, in which each bit of the mask has a value of "1". In this embodiment, FALSE is represented by a 32-bit mask, in which each bit of the mask has a value of "0". However, it should be noted that a 32-bit mask is used to support single precision floating point format as defined by IEEE Standard 754. Accordingly, a mask that is longer or shorter than thirty-two (32) bits would be used to support a floating-point format that is different than the single precision format. As an example, a 64-bit mask would be used to support a double precision floating-point format as defined by IEEE Standard 754. As another example, an 80-bit mask would be used to support an extended double precision floating-point format as defined by IEEE Standard 754.

The output 524 of SUBTRACT operator 506 is fed into">" comparator 508 as the first operand (OP1) 526 of the comparator 508. A real value 530 of 0.0 is fed into ">" comparator 508 as the second operand 528 of the comparator 508. As stated above, the output 524 of SUBSTRACT operator 506 is the fractional portion of input value, and is represented in floating-point format. Accordingly, if the fractional portion of input value is greater than 0.0, ">" comparator 508 returns a TRUE. Otherwise, ">" comparator 508 returns a FALSE.

"AND" operator 510 has two operands 534, 536, performs a bit-wise logical AND operation on the two operands 534, 536, and returns the result. Rounding apparatus 500 uses "AND" operator 510 to generate an adjustment value 538 to be added to the integral portion of input value to appropriately round the input value in accordance with the "ceiling" or "rounding to plus infinity (+∞)" technique. The adjustment value 538 is represented in floating-point format and has a real value of either 1.0 or 0.0.

A real value of 1.0 is fed into "AND" operator 510 as the first operand (OP1) 534 of the operator 510. The output 532 of ">" comparator 508 is fed into "AND" operator 510 as the second operand (OP2) 536 of the operator 508. As stated above, the output 532 of ">" comparator 508 is a boolean value 532. This boolean value 532 generally serves as a mask enabling "AND" operator 510 to generate an adjustment value 538 that is to be added to the integral portion of input value 514 to correctly round the input value 514. The adjustment value 538 is a real number represented in floating-point format. If boolean value 532 is TRUE, "AND" operator 510 returns an adjustment value 538 of 1.0. If boolean value 532 is FALSE, "AND" operator 510 returns an adjustment value 538 of 0.0.

ADD operator 512 has two operands 542, 544, and returns the sum of the operands 542, 544. The integral portion 518 of input value is fed into ADD operator 512 as the first operand (OP1) 542 of the operator. It should be noted that this integral portion 518 is represented in floating-point format, and is the same value which is fed into the second operand 522 of SUBTRACT operator 506.

The output 538 of "AND" operator 510 is fed into ADD operator 512 as the second operand (OP2) 544 of the operator 512. As stated above, the output 538 of "AND" operator 510 is an adjustment value 538 of either 1.0 or 0.0. Accordingly, ADD operator 512 adds the adjustment value 538 to the integral portion 518 of input value, and returns the resulting sum 546. This resulting sum 546 is essentially the output of rounding apparatus 500, and is represented in floating-point format.

It should also be noted that the functional components, as shown in FIGS. 2 to 5 and described in the text accompanying the figures, could be implemented in hardware. However, these functional components can also be implemented using software code segments. Each of the code segments may include one or more assembly instructions. If the aforementioned functional components are implemented using software code segments, these code segments can be stored on a machine-readable medium, such as floppy disk, hard drive, CD-ROM, DVD, tape, memory, or any storage device that is accessible by a computing machine.

FIGS. 6 to 9 are exemplary flow diagrams outlining the processes of rounding real numbers using the aforementioned rounding techniques in accordance with the principles of the current invention. Each of processes outlined in FIGS. 6 to 9 outlines one of the aforementioned rounding techniques, including (1) truncation or "rounding toward zero", (2) "rounding to the nearest integer" or "rounding toward the nearest representable value", (3) "floor" or "rounding toward minus infinity (−∞)", and (4) "ceiling" or "rounding toward plus infinity (+∞)". In each of these processes, a real number is accepted. The real number is represented in floating-point format. The real number is then rounded or converted to an integer value. The integer value is represented in floating-point format, and is the output of the process.

Figure 6:
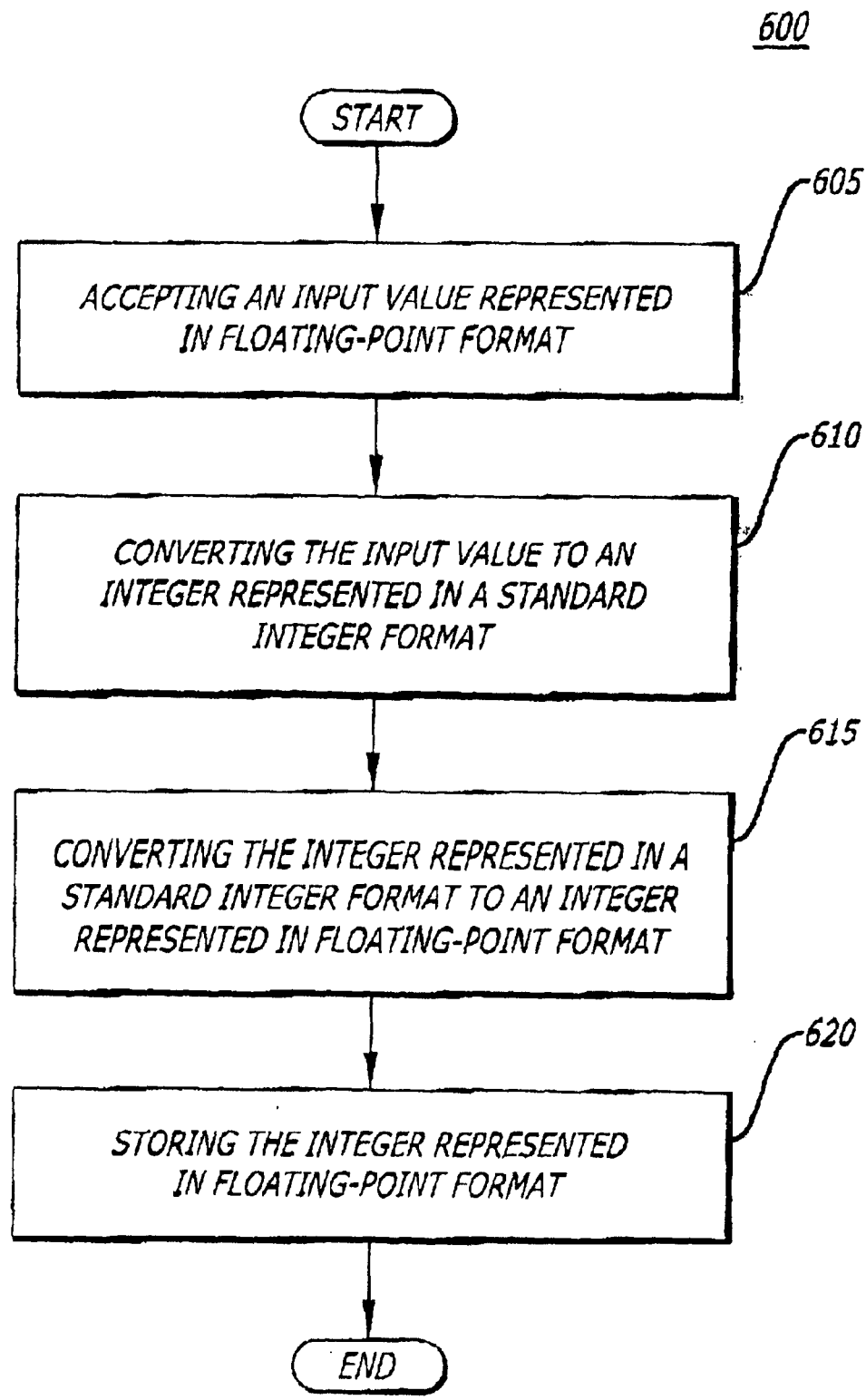
FIG. 6 is an exemplary flow diagram that generally outlines the process of rounding or converting real numbers to integers represented in floating-point format using the truncation technique in accordance with one embodiment of the present invention.

FIG. 6 is an exemplary flow diagram that generally outlines the process 600 of rounding or converting real numbers to integers represented in floating-point format using the truncation technique in accordance with one embodiment of the present invention.

An input value is accepted in block 605. The input value is a real number and is represented in floating-point format. In block 610, the real number is converted to an integer represented in a standard integer format using a truncation operation. The truncation operation accepts as input a real number represented in floating-point format, and returns as output an integer represented in a standard integer format. In one embodiment, the truncation operation may be implemented using the "cvttss2si" assembly instruction, which is included in the instruction sets of processors based on the Intel architecture. Additional details on the "cvttss2si" assembly instruction can be found in the "Intel Architecture Software Developer's Manual: Volume 2 Instruction Set Reference" for the Intel Pentium® III processor.

In block 615, the integer represented in a standard integer format is converted to an integer represented in floating-point format The integer represented in floating-point format is the output of the rounding or conversion process 600, and is stored or saved in block 620.

Figure 7:
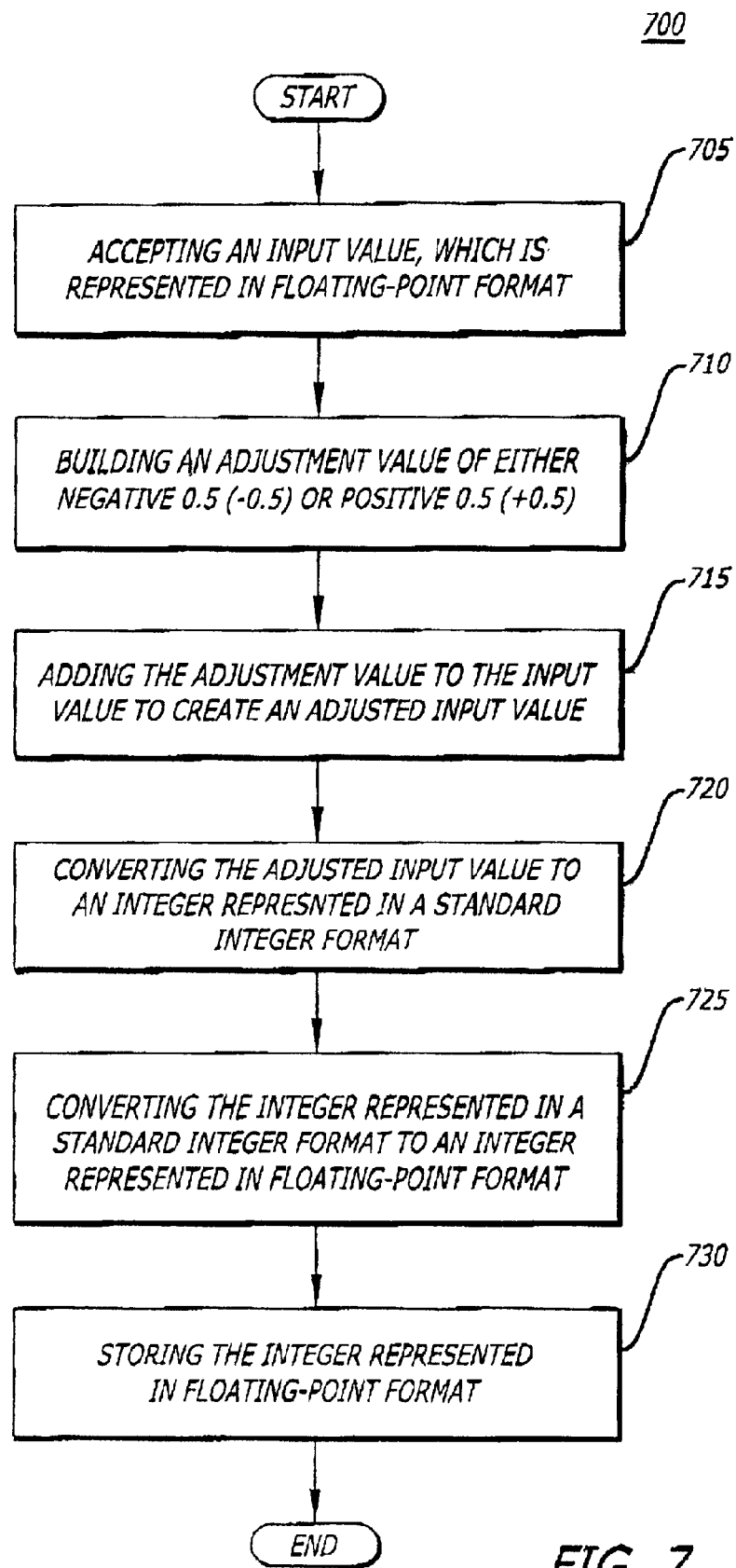
FIG. 7 is an exemplary flow diagram that generally outlines the process of rounding or converting a real number to an integer represented in floating-point format using the "rounding to the nearest integer" or "rounding toward the nearest representable value" technique in accordance with one embodiment of the present invention.

FIG. 7 is a flow diagram that generally outlines the process 700 of rounding or converting a real number to an integer represented in floating-point format using the "rounding to the nearest integer" or "rounding toward the nearest representable value" technique in accordance with one embodiment of the present invention.

An input value is accepted in block 705. The input value is a real number and is represented in floating-point format. An adjustment value of either negative 0.5 (−0.5) or positive 0.5 (+0.5) is built or generated in block 710. If the input value is a negative value, an adjustment value of −0.5 is built or generated. Otherwise, an adjustment value of +0.5 is built or generated. The adjustment value is represented in floating-point format.

After it is built in block 710, the adjustment value is added to the input value to create an adjusted input value (block 715). The adjusted input value is represented in floating-point format, and is converted into an integer value that is represented in a standard integer format (block 720). In the conversion, the fractional portion of the adjusted input value is truncated to create an integer value, which is represented in a standard integer format.

The integer value represented in a standard integer format is then converted to an integer represented in floating-point format (block 725). The integer represented in floating-point format is the output of the rounding or conversion process 700, and is stored or saved in block 730.

Figure 8:
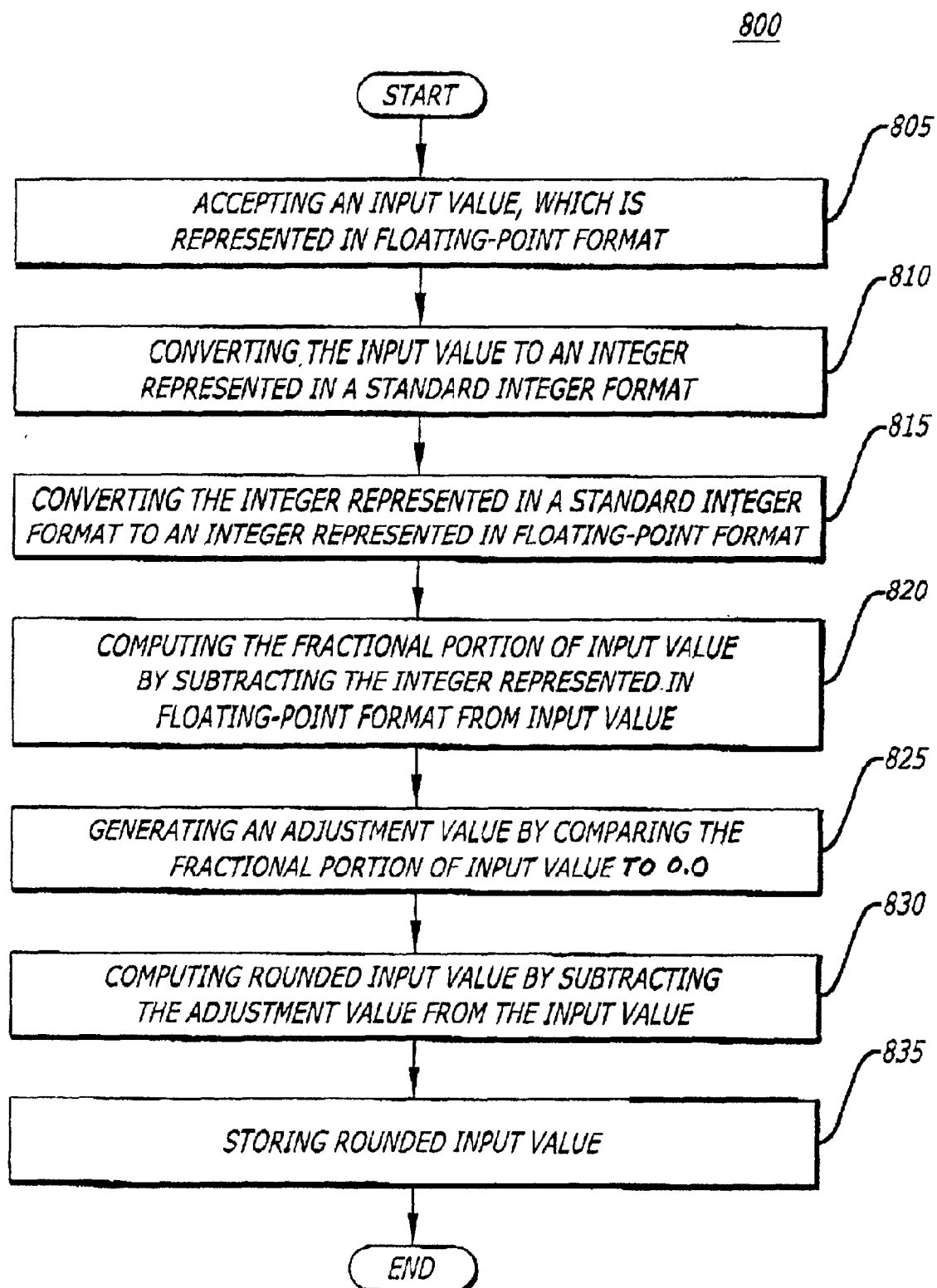
FIG. 8 is an exemplary flow diagram that generally outlines the process of rounding or converting a real number to an integer represented in floating-point format using the "floor" or "rounding toward minus infinity (−∞)" technique in accordance with one embodiment of the present invention.

FIG. 8 is a flow diagram that generally outlines the process 800 of rounding or converting a real number to an integer represented in floating-point format using the "floor" or "rounding toward minus infinity (−∞)" technique in accordance with one embodiment of the present invention.

An input value is accepted in block 805. The input value is a real number and is represented in floating-point format. In block 810, the input value is converted to an integer represented in a standard integer format using a truncation operation. This truncation operation accepts as input a real number represented in floating-point format, and returns as output an integer value represented in a standard integer format. In other words, the integral portion of the input value is computed in block 810, and is represented in a standard integer format.

The integer value computed in block 810 is then converted to an integer value represented in floating-point format (block 815). The integer value represented in floating-point format is subtracted from the input value to compute the fractional portion of the input value (block 820). The fractional portion of the input value is represented in floating-point format.

An adjustment value is generated in block 825 by comparing the fractional portion of the input value to a real value of 0.0. If the fractional portion of the input value were less than 0.0, the adjustment value would have a real value of 1.0. Otherwise if the fractional portion of the input value is equal to or greater than 0.0, the adjustment value would have a real value of 0.0.

In block 830, the adjustment value is then subtracted from the input value to create the rounded input value, which is the output of the process 800. The output of the process 800 is represented in floating-point format, and is stored or saved in block 835.

Figure 9:
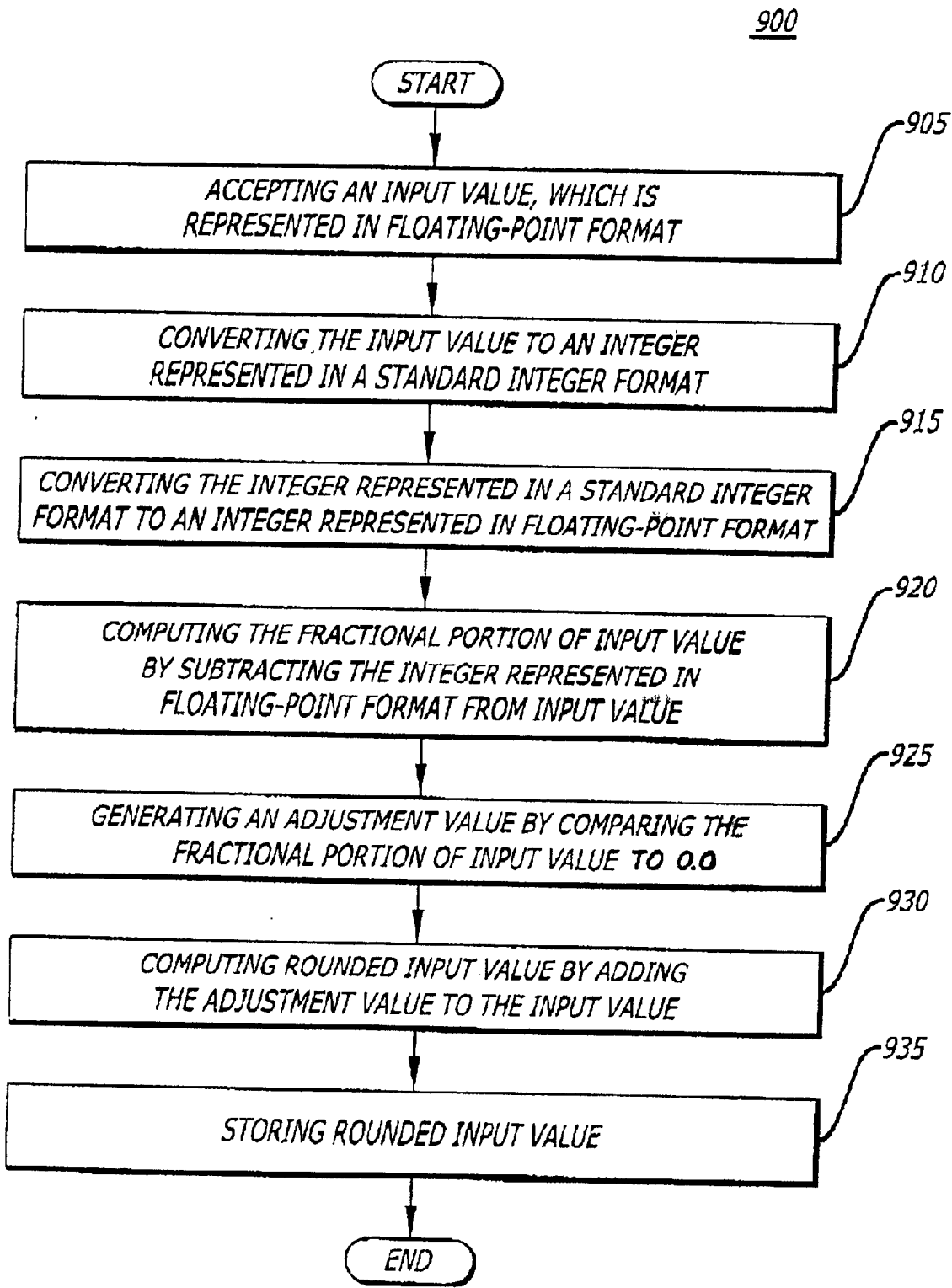
FIG. 9 is an exemplary flow diagram that generally outlines the process of rounding or converting a real number to an integer represented in floating-point format using the "ceiling" or "rounding toward plus infinity (−∞)" technique in accordance with one embodiment of the present invention.

FIG. 9 is a flow diagram that generally outlines the process 900 of rounding or converting a real number to an integer represented in floating-point format using the "ceiling" or "rounding toward plus infinity (−∞)" technique in accordance with one embodiment of the present invention.

An input value is accepted in block 905. The input value is a real number and is represented in floating-point format. In block 910, the input value is converted to an integer represented in a standard integer format using a truncation operation. This truncation operation accepts as input a real number represented in floating-point format, and returns as output an integer value represented in a standard integer format. In other words, the integral portion of the input value is computed in block 910, and is represented in a standard integer format.

The integer value computed in block 910 is then converted to an integer value represented in floating-point format (block 915). The integer value represented in floating-point format is subtracted from the input value to compute the fractional portion of the input value (block 920). The fractional portion of the input value is represented in floating-point format.

An adjustment value is generated in block 925. If the fractional portion of the input value is greater than 0.0, the adjustment value would have a real value of 1.0. Otherwise if the fractional portion of the input value were less than or equal to 0.0, the adjustment value would have a real value of 0.0.

In block 930, the adjustment value is then added to the input value to create the rounded input value, which is the output of the process 900. The output of the process 900 is represented in floating-point format, and is stored or saved in block 935.

While certain exemplary embodiments have been described and shown in accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A computing system, comprising:
 a rounding apparatus for rounding an input value to a nearest integer to accept an input value that is a real number represented in floating-point format, and to perform a rounding operation on the input value to generate an output value that is an integer represented in floating-point format, the rounding apparatus comprising:
  a sign bit extractor to determine an extracted sign bit of the input value,
  an adjustment generator to perform an "OR" operation on the extracted sign bit and a selected real value, generating an adjustment value,
  an adding unit to compute an adjusted input value by adding the adjustment value to the input value, the adjusted input value being a real number represented in floating-point format,
  a floating-point to integer converter to truncate a fractional portion of the adjusted input value to convert the adjusted input value to an integer represented in an integer format, and
  an integer to floating-point converter to convert the integer represented in an integer format to generate the output value;
 a memory to store a computer program that utilizes the rounding apparatus; and
 a central processing unit (CPU) to execute the computer program, the CPU is cooperatively connected to the rounding apparatus and the rneruozy,
 wherein the adjustment generator generates the adjustment value by performing a bit-wise logical OR operation on the sign bit and the selected real value, where the selected real value is 0.5.

2. A computing system, comprising:
 a rounding apparatus for rounding an input value toward minus infinity (−∞) to accept an input value that is a real number represented in floating-point format, and to perform a rounding operation on the input value to generate an output value that is an integer represented in floating-point format, the rounding apparatus comprising:
  a floating-point to integer converter to truncate an input value to convert the input value to a first integer represented in an integer format;
  an integer to floating-point converter to convert the first integer represented in an integer format to a second integer represented in floating-point format;
  a portion generator to compute a fractional portion of the input value by subtracting the second integer from the input value, generating a fractional portion of the input value;
  a comparator to generate a boolean mask by performing a "less than" comparison of the fractional portion of the input value and a first selected real value;
  an adjustment generator to generate an adjustment value represented in floating-point form using the boolean mask added to a second selected real value; and
  a subtractor unit to generate an output value by subtracting the adjustment value from the second integer;
 a memory to store a computer program that utilizes the rounding apparatus; and
 a central processing unit (CPU) to execute the computer program, the CPU is cooperatively connected to the rounding apparatus and the memory.

3. The system of claim 2, wherein the first selected real value is 0.0, and wherein the comparator uses a "less than" compare to generate the boolean mask by comparing the fractional portion of the input value to the first selected real value of 0.0.

4. The system of claim 2, wherein the second selected real value is 1.0, and wherein the adjustment generator generates the adjustment value by performing a bit-wise logical AND operation on the boolean mask and the second selected real value of 1.0.

5. A computing system, comprising:
 a rounding apparatus rounding an input value toward plus infinity (+∞) to accept an input value that is a real number represented in floating-point format, and to perform a rounding operation on the input value to generate an output value that is an integer represented in floating-point format, the rounding apparatus comprising:
  a floating-point to integer convener to truncate an input value to convert the input value to a first integer represented in an integer format;
  an integer to floating-point converter to convert the first integer represented in an integer format to a second integer represented in floating-point format;
  a portion generator to compute a fractional portion of the input value by subtracting the second integer from the input value, generating a fractional portion of the input value;
  a comparator to generate a boolean mask by performing a "greater than" comparison of the fractional portion of the input value and a first selected real value;
  an adjustment generator to generate an adjustment value represented in floating-point form using the boolean mask and a second selected real value; and
  an adding unit to generate an output value by adding the adjustment value to the second integer;
 a memory to store a computer program that utilizes the rounding apparatus; and
 a central processing unit (CPU) to execute the computer program, the CPU is cooperatively connected to the rounding apparatus and the memory.

6. The system of claim 5, wherein the first selected real value is 0.0, and wherein the comparator generates the boolean mask by comparing the fractional portion of the input value to the first selected real value of 0.0.

7. The system of claim 5, wherein the second selected real value is 1.0, and wherein the adjustment generator generates the adjustment value by performing a bit-wise logical AND operation on the boolean mask and the second selected real value of 10.

8. A method comprising:
 building an adjustment value represented in floating-point format;
 adding the adjustment value to an input value to generate an adjusted input value represented in floating-point format;
 truncating the adjusted input value to convert the adjusted input value to a first integer represented in an integer format;
 converting the first integer represented in an integer format to a second integer represented in floating-point format; and
 storing the second integer as an output value,
 wherein building the adjustment value comprises:
  building the adjustment value by performing a bit-wise logical OR operation on a real value of 0.5 and a sign bit extracted from the input value.

9. A machine-readable medium comprising instructions which, when executed by a machine, cause the machine to perform operations comprising:

a first code segment to extract a sign bit of the input value;

a second code segment to generate an adjustment value based on the sign bit;

a third code segment to compute an adjusted input value represented in floating-point format;

a fourth code segment to truncate a fractional portion of the adjusted input value to convert the adjusted input value to an integer represented in an integer format; and a fifth code segment to convert the integer represented in an integer format to generate the output value, wherein the second code segment generates the adjustment value by performing a bit-wise logical OR operation on the sign bit and a value of 0.5.

10. A machine-readable medium comprising instructions which, when executed by a machine, cause the machine to perform operations comprising:

a first code segment to truncate an input value to convert the input value to a first integer represented in an integer format;

a second code segment to floating-point converter to convert the first integer represented in an integer format to a second integer represented in floating-point format;

a third code segment to subtract the second integer from the input value to compute a fractional portion of the input value;

a fourth code segment to generate a boolean mask based on the fractional portion of the input value;

a fifth code segment to generate an adjustment value represented in floating-point format by performing a bit-wise logical AND operation on die boolean mask and a selected real value; and a sixth code segment to subtract the adjustment value from the input value to generate the output value represented in floating-point format.

11. The machine-readable medium of claim 10, wherein the fourth code segment generates the boolean mask by comparing the fractional portion of the input value to a real value of 0.0.

12. The machine-readable medium as recited in claim 11, wherein the comparison of the fourth code segment generates a true Boolean mask when the fractional portion is less than the real value of 0.0.

13. The machine-readable medium as recited in claim 11, wherein the comparison of the fourth code segment generates a true Boolean mask when the fractional portion is greater than the real value of 0.0.

14. The machine-readable medium of claim 10, wherein the selected real value is 1.0.

15. A method comprising:

generating a first integer represented in an integer format by truncating an input value;

converting the first integer represented in an integer format to a second integer represented in floating-point format;

computing a fractional portion of the input value using the second integer represented in floating-point format;

generating a boolean value using the fractional portion of the input value;

creating an adjustment value by performing a bit-wise logical AND operation using the boolean value and a selected real value; and computing a rounded input value by additively combining the adjustment value with the input value.

16. The method as recited by claim 15, wherein additively combining the adjustment value with the input value comprises subtracting the adjustment value from the input value.

17. The method of claim 16, wherein computing the fractional portion of the input value comprises:

subtracting the second integer represented in floating-point format from the input value to generate the fractional portion of the input value.

18. The method of claim 16, wherein generating the boolean value comprises comparing the fractional portion of the input value to a real value of 0.0.

19. The method of claim 16, wherein creating an adjustment value comprises performing a bit-wise logical AND operation on the boolean value and a real value of 1.0.

20. The method as recited in claim 15, wherein additively combining the adjustment value with the input value comprises adding the adjustment value to the input value to generate a rounded input value, and wherein computing a fractional portion of the input values using the second integer represented in floating-point format comprises subtracting the second integer represented in floating-point format from the input value.

21. The method of claim 20, wherein creating an adjustment value comprises:

comparing the fractional portion of the input value to a real value of 0.0.

22. The method of claim 20 wherein creating an adjustment value comprises:

performing a bit-wise logical AND operation on the boolean value and a real value of 1.0.

23. The method as recited in claim 15, wherein the generating a Boolean value generates a true Boolean mask when the fractional portion is less than a real value of 0.0.

24. The method as recited in claim 15, wherein the generating a Boolean value generates a true Boolean mask when the fractional portion is greater than a real value of 0.0.

25. A computing system, comprising:

a rounding apparatus to accept an input value that is a real number represented in floating-point format, and to perform a rounding operation on the input value to generate an output value that is an integer represented in floating-point format, the rounding apparatus comprising:

a floating-point to integer converter to truncate an input value to convert the input value to a first integer represented in an integer format, an integer to floating-point converter to convert the first integer represented in an integer format to a second integer represented in floating-point format, a portion generator to compute a fractional portion of the input value by subtracting the second integer from the input value, generating a fractional portion of the input value, a comparator to generate a boolean mask by comparing the fractional portion of the input value to a first selected real value, an adjustment generator to generate an adjustment value represented in floating-point form using the boolean mask added to a second selected real value, and a subtractor unit to generate an output value by subtracting the adjustment value from the input value;

a memory to store a computer program that utilizes the rounding apparatus; and a central processing unit (CPU) to execute the computer program, the CPU is cooperatively connected to the rounding apparatus and the memory.

* * * * *

UNITED STATES PATENT AND TRADEMARK OFFICE
CERTIFICATE OF CORRECTION

PATENT NO. : 6,879,992 B2
DATED : April 12, 2005
INVENTOR(S) : Zohar

It is certified that error appears in the above-identified patent and that said Letters Patent is hereby corrected as shown below:

Column 3,
Line 38, delete "(-1.10)", and insert -- (-1.0) --.

Column 7,
Line 35, delete "UP-to-INT", and insert -- FP-to-INT --.

Signed and Sealed this

Fifth Day of July, 2005

JON W. DUDAS
*Director of the United States Patent and Trademark Office*